United States Patent

[11] 3,576,513

[72] Inventors Victor G. Mathison
 Solana Beach;
 Charles W. Yungblut, San Diego, Calif.
[21] Appl. No. 856,661
[22] Filed Sept. 10, 1969
[45] Patented Apr. 27, 1971
[73] Assignee Electra/Midland Corporation
 Kansas City, Kans.

[54] SLIDER ASSEMBLY FOR LEAD SCREW ACTUATED POTENTIOMETER
 2 Claims, 5 Drawing Figs.
[52] U.S. Cl. .................................................. 338/180,
 338/202
[51] Int. Cl. ..................................................... H01c 9/02
[50] Field of Search ........................................... 338/176,
 180, 181, 183, 202

[56] References Cited
UNITED STATES PATENTS

| | | | |
|---|---|---|---|
| 2,777,926 | 1/1957 | Bourns .......................... | 338/180 |
| 2,935,716 | 5/1960 | Bourns .......................... | 338/180 |
| 3,238,488 | 1/1966 | Langenbach et al. .......... | 338/183X |
| 3,400,355 | 9/1968 | Van Benthuysen et al. ... | 338/183 |

Primary Examiner—Lewis H. Myers
Assistant Examiner—D. A. Tone
Attorney—Wolfe, Hubbard, Leydig, Voit & Osann ABSTRACT: A slider for a miniaturized potentiometer having a plastic body in the form of half nut for engaging the lead screw and in which the contact member is of "sled" shape with a reversely bent wiper portion and pointed runner or side portions, which side portions are accommodated in recesses formed in the sides of the body and held in place by reason of an interference fit with the points digging into the body of the slider.

PATENTED APR 27 1971 3,576,513

Fig. 5 ASSEMBLY

INVENTORS
VICTOR G. MATHISON
CHARLES W. YUNGBLUT by: Wolfe, Hubbard, Voit & Osann
ATTYS.

SLIDER ASSEMBLY FOR LEAD SCREW ACTUATED POTENTIOMETER

It is an object of the invention to provide a slider assembly for a lead screw actuated potentiometer which permits easy assembly and which provides positive and reliable contact but which may nevertheless be highly miniaturized for use in potentiometers of minimum physical size. It is a more specific object to provide a highly miniaturized slider assembly providing an interference fit between the body and the contact member with penetrating engagement of the body by oppositely directed points of the contact member, thereby permitting a wide dimensional tolerance enabling low-cost manufacture with no necessity for individual inspection as to size. It is yet another object to provide a slider assembly which is maintained stably in place and in which the reaction force of the wiper portion, when the device is assembled in place, further insures against possible dislodgement.

Other objects and advantages of the invention will become apparent upon reading the attached detailed description and upon reference to the drawings in which:

FIG. 5 shows the manner in which the contact member is assembled to the slider body.

While the invention has been described in connection with a preferred embodiment, it will be understood that we do not intend to limit the invention to the particular form shown but intend on the contrary to cover the various alternative and equivalent constructions included within the spirit and scope of the appended claims.

Figure 1:
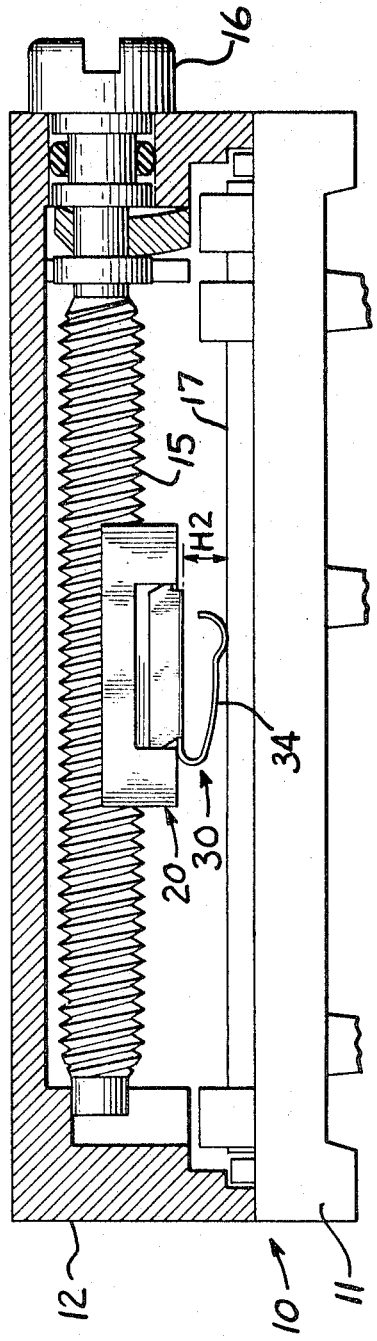
FIG. 1 is a vertical section taken longitudinally through a potentiometer embodying the present invention.

Turning now to the drawings, there is disclosed in FIG. 1 a lead screw actuated potentiometer 10 having a base 11 and enclosure 12. Mounted for rotation in the enclosure is a threaded lead screw 15 having a slotted head 16. Arranged below and parallel to the lead screw is a substrate 17 which carries the resistance element, well known in the art, as well as an adjacent contact strip.

Figure 2:
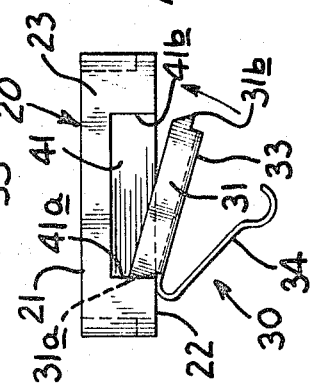
Figure 2:
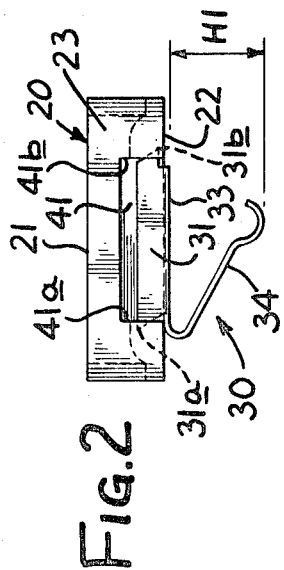

In accordance with the present invention, a slider assembly is interposed between the lead screw and the substrate for propelling in opposite directions by the lead screw, the slider body being straddlingly engaged by a contact member in the shape of a sled having a reversely bent wiper, the sides of the slider body being dimensioned to receive the sides of the contact member and with the sides of the contact member being formed for an interfering retentive fit with the body. More specifically, a slider assembly is provided as shown in FIG. 2 having a body 20 of generally rectangular shape and formed of plastic having approximately the same physical characteristics as nylon. The body has an upper surface 21, a lower surface 22 and side surfaces 23, 24. The upper surface is molded to form a longitudinal troughlike recess 25 which serves as a half nut in engaging the threads of the lead screw 15.

Figure 3:
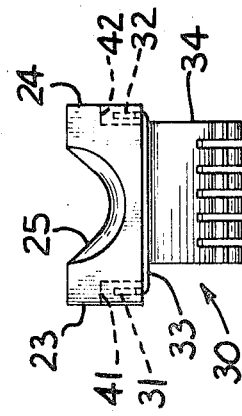
FIGS. 2, 3 and 4 are side, end and bottom views, respectively, of the slider assembly shown in FIG. 1 prior to installation.
Figure 4:
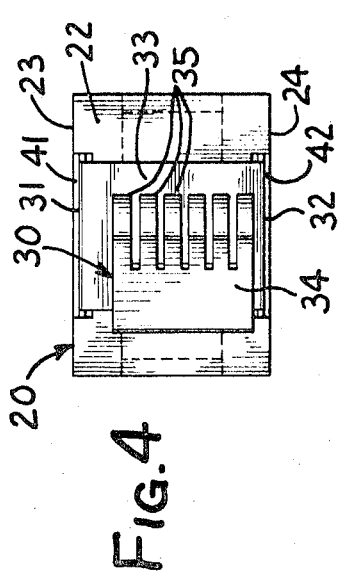

Secured to the underside of the body 20 is a contact member 30 in the shape of a miniature sled having flat runnerlike sides 31, 32 joined by a flat surface 33 which is extended at one end to form an integral, reversely bent wiper 34. The tip of the wiper is slit as shown in FIGS. 3 and 4 to provide individual spring fingers 35 arranged parallel to one another.

Further in accordance with the invention, the body 20 of the slider is formed with lateral recesses for receiving the sides of the contact member, the sides being pointed for penetrating engagement with shoulders at the ends of the recesses. Thus the body 20 has, integrally molded therein, rectangular recesses 41, 42 for receiving the sides 31, 32 of the contact member, the ends of the recess 41 serving to define shoulders 41a, 41b which are engaged by points 31a, 31b, at the respective ends of the side runner 31. By penetrating engagement is meant that the points actually indent or project into the surfaces of the shoulders.

Preferably the points 31a, 31b are angled in opposite directions, with the point 31a being angled inwardly with respect to the supporting body and the point 31b being angled outwardly to facilitate assembly. Thus, as shown in FIG. 5, during the assembly of the members, the contact member 30 is seated at one end in a cocked position with the inwardly angled point 31a in contact with the shoulder 41a. Pressure is applied to rock the contact member in the direction of the arrow so that the outwardly facing point 31b cams over the surface 41b and then hooks into it, as shown in FIG. 2, for positive retention. During construction of the slider assemblies in quantity, the two parts may be put together for later insertion, as a subassembly, into the potentiometer.

Preferably the wiper 34 is, in the normal state, spring outwardly so as to provide a head height indicated at H1 in FIG. 2. When the slider assembly is installed in the potentiometer, the wiper is compressed to a substantially reduced head height indicated at H2. This not only develops a reliably high contact pressure, urging the body 20 in the direction of the screw, but it also insures against possible dislodgement of the contact member from the body during the life of the potentiometer. Formation of the wiper 34 into the individual spring fingers 35 insures that pressure is evenly distributed between the resistance element and the contact strip which is parallel to it in the usual potentiometer construction. Moreover, by making the wiper fingers extend substantially the entire width of the contact member lateral stability is assured, with minimum tendency to roll from side to side as the direction is reversed. The digging in at the four points also insures against any lateral shift of the contact member with respect to the body as the screw reverses. Provided that the screw itself is blocked against endwise movement, the result is complete avoidance of backlash.

The above design of slider assembly has been found to be particularly advantageous for highly miniaturized lead screw potentiometers in which the entire potentiometer housing has a length of only about three-quarter inch and where the slider assembly, on such scale, has a length which is substantially less than one-quarter inch. When dealing with such small parts on a quantity production basis, tolerances become a major problem. It is not considered practical to apply micrometer measuring techniques for individual finishing to a prescribed length because of the expense of individual handling. Even techniques of measurement and selection are not desirable because of the time required and the high percentage of rejected parts. When employing the present construction tolerances are of little consequence since the point-to-point length of a runner 31 may be designed to be substantially greater than the shoulder-to-shoulder length of the accommodating recess 41, the amount of excess length being such as to insure interfering engagement even where the pieces are at the ends of the tolerance range. In other words, regardless of manufacturing tolerance, positive hooking engagement between the points and the shoulder surfaces is assured and the only variable from piece to piece is the amount of penetration of the points into the engaged surfaces.

The contact member is preferably of phosphor bronze alloy stamped from flat stock and bent into shape. Nylon is preferred as the body material since it is sufficiently softer than the contact material as to be subject to indenting engagement by the points, but it is nevertheless extremely tough so as to resist localized rupture. It will be appreciated that plastic materials other than nylon, but having approximately the same characteristics as regards acceptance of, and engagement by, the points may be employed.

Regardless of the degree of miniaturization, a high level of contact reliability under the most severe operating conditions may be achieved combined with a high degree of economy.

We claim:

1. In a lead screw actuated potentiometer having a lead screw with a resistance element arranged parallel thereto, a slider body of generally rectangular shape having a trough-shaped recess formed in its upper side in engagement with the lead screw, a contact member of sled shape having side runner portions and an integral reversely bent wiper slideably engaging the resistance element, means defining recesses formed on the respective sides of the slider body receiving the side portions of the contact member, the contact member being seated straddlingly on the body, the recess defining means including shoulders at the ends of the recesses, the slider body being formed of relatively soft plastic material, and the side portions of the contact member being pointed at the ends and in retentive engagement with the shoulders, the contact member being pressed into seated position, the points at one of the ends of the side members having an adjacent angled surface to facilitate entry by rocking the contact member about the other end thereof into seated position incident to assembly.

2. The combination as claimed in claim 1 in which the points at the ends of the side members are angled in respectively opposite directions to facilitate rocking the contact member about one end thereof into seated position incident to assembly.